(12) United States Patent
Shimizu et al.

(10) Patent No.: US 9,387,875 B2
(45) Date of Patent: Jul. 12, 2016

(54) ELECTRIC POWER STEERING APPARATUS

(75) Inventors: Yasuo Shimizu, Shimotsuke (JP);
Atsuhiko Yoneda, Utsunomiya (JP);
Shigeru Yamawaki, Tochigi-ken (JP);
Yoshihiro Oniwa, Utsunomiya (JP);
Yukihiro Wakakuwa, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/358,249

(22) Filed: Jan. 25, 2012

(65) Prior Publication Data
US 2012/0199414 A1 Aug. 9, 2012

(30) Foreign Application Priority Data

Feb. 9, 2011 (JP) .................. 2011-025613

(51) Int. Cl.
*B62D 5/04* (2006.01)
*B62D 6/00* (2006.01)

(52) U.S. Cl.
CPC ............ *B62D 5/0463* (2013.01); *B62D 5/0484* (2013.01); *B62D 6/008* (2013.01)

(58) Field of Classification Search
CPC .................................................. B62D 5/0463
USPC .................................... 180/446, 443; 701/42
See application file for complete search history.

(56) References Cited

U.S. PATENT DOCUMENTS

| 5,398,953 | A | * | 3/1995 | Shimizu | ......................... | 180/446 |
| 6,041,887 | A | * | 3/2000 | Kojo et al. | ..................... | 180/446 |
| 6,382,345 | B2 | * | 5/2002 | Kada et al. | ..................... | 180/446 |
| 6,405,113 | B1 | * | 6/2002 | Yamawaki et al. | ............. | 701/41 |
| 6,470,994 | B1 | * | 10/2002 | Shimizu et al. | ............... | 180/446 |
| 6,705,424 | B2 | * | 3/2004 | Ogawa et al. | ................. | 180/446 |

(Continued)

FOREIGN PATENT DOCUMENTS

DE 60 2004 002 640 T2 8/2007
JP 2-133282 A 5/1990

(Continued)

OTHER PUBLICATIONS

German Office Action from German App. No. 102012201877.8 dated Jun. 6, 2012.

(Continued)

*Primary Examiner* — Joseph Rocca
*Assistant Examiner* — Conan Duda
(74) *Attorney, Agent, or Firm* — Carrier Blackman & Associates, P.C.; Joseph P. Carrier; Jeffrey T. Gedeon (57) ABSTRACT

An electric power steering apparatus includes a motor control unit for controlling an electric motor operatively connected to a steering shaft. The motor control unit includes a first control unit for controlling a steering torque detected by a torque detecting unit so as to bring the steering torque to zero or to a first predetermined value, and a second control unit for controlling the steering torque detected by the torque detecting unit so as to bring the steering torque to a second predetermined value which is greater than zero or than the first predetermined value, based on an operational quantity detected by an operational-quantity detecting unit or a quantity representative of a vehicle behavior detected by a vehicle-behavior detecting unit. The motor control unit controls the electric motor based on an output signal from the first control unit and an output signal from the second control unit.

7 Claims, 7 Drawing Sheets

(56) References Cited

U.S. PATENT DOCUMENTS

| | | | |
|---|---|---|---|
| 7,091,686 B2* | 8/2006 | Kagei | 318/434 |
| 7,203,582 B2* | 4/2007 | Yokota | 701/41 |
| 7,295,908 B2* | 11/2007 | Goto et al. | 701/43 |
| 7,359,778 B2* | 4/2008 | Goto et al. | 701/41 |
| 7,581,616 B2* | 9/2009 | Goto et al. | 180/402 |
| 7,712,572 B2* | 5/2010 | Schonauer et al. | 180/333 |
| 7,837,004 B2* | 11/2010 | Yasuda | 180/446 |
| 7,937,200 B2* | 5/2011 | Shimizu et al. | 701/41 |
| 8,091,679 B2* | 1/2012 | Sakaguchi et al. | 180/446 |
| 2003/0168275 A1* | 9/2003 | Sakugawa | 180/402 |
| 2004/0016590 A1* | 1/2004 | Iwano | 180/443 |
| 2004/0138797 A1* | 7/2004 | Yao et al. | 701/44 |
| 2005/0236223 A1* | 10/2005 | Yokota | 180/446 |
| 2006/0000663 A1* | 1/2006 | Takimoto | B62D 6/008 180/446 |
| 2006/0253726 A1* | 11/2006 | Kukshya et al. | 714/4 |
| 2007/0205041 A1* | 9/2007 | Nishizaki et al. | 180/446 |
| 2010/0168964 A1* | 7/2010 | Higashi | B62D 5/008 701/42 |
| 2010/0299027 A1* | 11/2010 | Aoki | 701/42 |
| 2011/0231066 A1* | 9/2011 | Ohno et al. | 701/42 |
| 2014/0121904 A1* | 5/2014 | Dornhege et al. | 701/42 |

FOREIGN PATENT DOCUMENTS

| | | |
|---|---|---|
| JP | 04-027664 A | 1/1992 |
| JP | 2001-130424 A | 5/2001 |
| JP | 2002-120743 A | 4/2002 |
| JP | 2003-291834 A | 10/2003 |
| JP | 2006-256542 A | 9/2006 |
| JP | 2007-145153 A | 6/2007 |
| JP | 2009-090817 A | 4/2009 |
| JP | 2010-064544 A | 3/2010 |

OTHER PUBLICATIONS

German Search Report from German App. No. 102012201877.8 dated Jun. 6, 2012.

Notice of Allowance issued in Japanese Patent Application No. 2011-025613, mailed Feb. 5, 2013, 4 pages.

* cited by examiner

ELECTRIC POWER STEERING APPARATUS

CROSS-REFERENCE TO RELATED APPLICATION

This application is based upon and claims the benefit of priority from Japanese Patent Application No. 2011-025613 filed on Feb. 9, 2011, of which the contents are incorporated herein by reference.

BACKGROUND OF THE INVENTION

1. Field of the Invention

The present invention relates to an electric power steering apparatus which includes an electric motor that applies a force (steering assisting force) for assisting in a steering action made by the driver of a motor vehicle when the driver turns the steering wheel of the motor vehicle.

2. Description of the Related Art

There are known electric power steering apparatus which include an electric motor that applies a force (steering assisting force) for assisting in a steering action made by the driver of a motor vehicle in order to allow the driver to lightly turn the steering wheel of the motor vehicle {see U.S. Pat. No. 5,398,953 (hereinafter referred to as "U.S. Pat. No. 5,398,953 A")}.

According to U.S. Pat. No. 5,398,953 A, it is disclosed that the following expression (1) is satisfied (see line 61 on column 5 through line 19 on column 6):

$$TS \approx T = TL \pm Tf + TI - TM \qquad (1)$$

where TS represents a steering torque generated on a steering wheel, T a steering torque detected by a steering torque detector (13), TL a torque generated by a load that is applied from a road surface to road wheels, Tf a torque generated by the friction of a motor, gears and other components of the road wheel mechanisms, TI a torque generated by a motor inertia, a road wheel inertia, etc., and TM a torque generated by a motor torque (see line 61 on column 5 through line 19 on column 6).

According to U.S. Pat. No. 5,398,953 A, a process shown in FIG. 2 thereof is performed on the premise of the above expression (1). Specifically, a target steering torque (Tθ) is established based on a steering angle (θ). A deviation (ΔT) between the target steering torque (Tθ) and a manual steering torque (T) is calculated. A motor current value (IT) is established depending on the deviation (ΔT). A deviation (ΔI) between the motor current value (IT) and a detected signal (23a) from a motor current detector (23) is calculated. Based on the deviation (ΔI), operations of semiconductor devices (22a through 22d) are controlled (see line 18 on column 3 through line 43 on column 4, of U.S. Pat. No. 5,398,953 A).

SUMMARY OF THE INVENTION

According to U.S. Pat. No. 5,398,953 A, the target steering torque (Tθ) is established based on the steering angle (θ), and the deviation (ΔT) between the target steering torque (Tθ) and the manual steering torque (T) is calculated. However, because of a moment of inertia of the rotational shaft of the motor of the electric power steering apparatus, the viscosity of a grease in bearings, and the friction of the rotational shaft of the motor, etc., the steering feel of the driver of the vehicle tends to become poor, i.e., the response of a change in the behavior of the vehicle with respect to the turning operation of the steering wheel tends to be slowed. According to U.S. Pat. No. 5,398,953 A, furthermore, it is difficult to transmit, to the driver, steering reaction force due to varying coefficients of friction of road surfaces {different coefficients of friction provided by different road surfaces including dry, wet, sandy, snowy, and frozen road surfaces, and split road surfaces (i.e., different coefficients of friction of between a road surface and left and right road wheels)} and also due to different conditions of road surfaces such as ruts and road shoulders. Such a tendency, i.e., the difficulty to transmit steering reaction force to the driver, occurs notably particularly when the vehicle drives at highs speeds because the behavior of the vehicle is sensitive at those high speeds. According to U.S. Pat. No. 5,398,953 A, in addition, since steering reaction force is imparted depending on the steering angle (θ), a large number of man-hours for vehicle development are required in order to adapt the behavior of the vehicle for every driving situation of the vehicle.

It is an object of the present invention to provide an electric power steering apparatus which prevents a steering feel from becoming poor and which can be developed with a reduced number of man-hours.

According to the present invention, there is provided an electric power steering apparatus in a vehicle having road wheels and a steering handle which is operatively connected to the road wheels through a steering shaft, comprising a torque detecting unit for detecting a steering torque from the steering handle, an electric motor operatively connected to the steering shaft, a motor control unit for controlling the electric motor, and at least one of an operational-quantity detecting unit and a vehicle-behavior detecting unit, the operational-quantity detecting unit detecting an operational quantity of an operating member for generating a behavior of the vehicle in the transverse directions thereof or horizontal rotational directions, the vehicle-behavior detecting unit for detecting a quantity representative of the behavior of the vehicle in the transverse directions or the horizontal rotational directions, wherein the motor control unit includes a first control unit for controlling the steering torque detected by the torque detecting unit so as to bring the steering torque to zero or to a first predetermined value, and a second control unit for controlling the steering torque detected by the torque detecting unit so as to bring the steering torque to a second predetermined value which is greater than zero or than the first predetermined value, based on the operational quantity detected by the operational-quantity detecting unit or the quantity detected by the vehicle behavior detecting unit, and wherein the motor control unit controls the electric motor based on an output signal from the first control unit and an output signal from the second control unit.

According to the present invention, while the steering torque is being controlled so as to be brought to zero or the first predetermined value, the steering torque is also controlled so as to be brought to the second predetermined value which is greater than zero or than the first predetermined value, based on the operational quantity of the operating member which produces a behavior of the vehicle in the transverse directions thereof or horizontal directions, or the quantity of the behavior of the vehicle in the transverse directions thereof or horizontal directions. Since the steering torque is controlled so as to be brought to zero or the first predetermined value, it is possible to reduce the effects of the moment of inertia of the rotational shaft of the electric motor, the viscous resistance of grease in bearings, and the mechanical friction of moving parts.

At the same time, the steering torque is controlled so as to be brought to the second predetermined value. Consequently, the steering torque can be controlled easily. It is also possible to prevent sluggish steering response caused by a feedback response delay due to the effects of the moment of inertia, etc., and it is easy to transmit steering reaction force depending on changing coefficients of friction of the road surface and different conditions of the road surface to the driver for a better steering feel. Such a better steering feel manifests itself particularly when the vehicle is driven at high speeds because the behavior of the vehicle is sensitive at those high speeds. Furthermore, since steering reaction force is imparted depending on changing coefficients of friction of the road surface and different conditions of the road surface, the behavior of the vehicle can easily be controlled to adapt to every driving situation of the vehicle. As a result, the number of man-hours required to develop the electric power steering apparatus is reduced.

The electric power steering apparatus may further include a vehicle speed detecting unit for detecting a vehicle speed of the vehicle, wherein the motor control unit may correct the second predetermined value based on the vehicle speed detected by the vehicle speed detecting unit. Consequently, the second predetermined value can be adjusted depending on the vehicle speed. If the second predetermined value is mainly used as a target value for the steering torque, then since the target value for the steering torque can be adjusted depending on the vehicle speed, it is possible to control the steering torque for a better steering feel.

The operational-quantity detecting unit may detect a steering quantity of the steering handle. The vehicle-behavior detecting unit may comprise at least one of a lateral acceleration sensor for detecting a lateral acceleration of the vehicle and a yaw rate sensor for detecting a yaw rate of the vehicle.

The motor control unit controls the first control unit and the second control unit such that the first control unit may control the steering torque detected by the torque detecting unit so as to bring the steering torque to the second predetermined value in the event of a failure of the second control unit.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

I. First Embodiment

A. Arrangement

Figure 1:
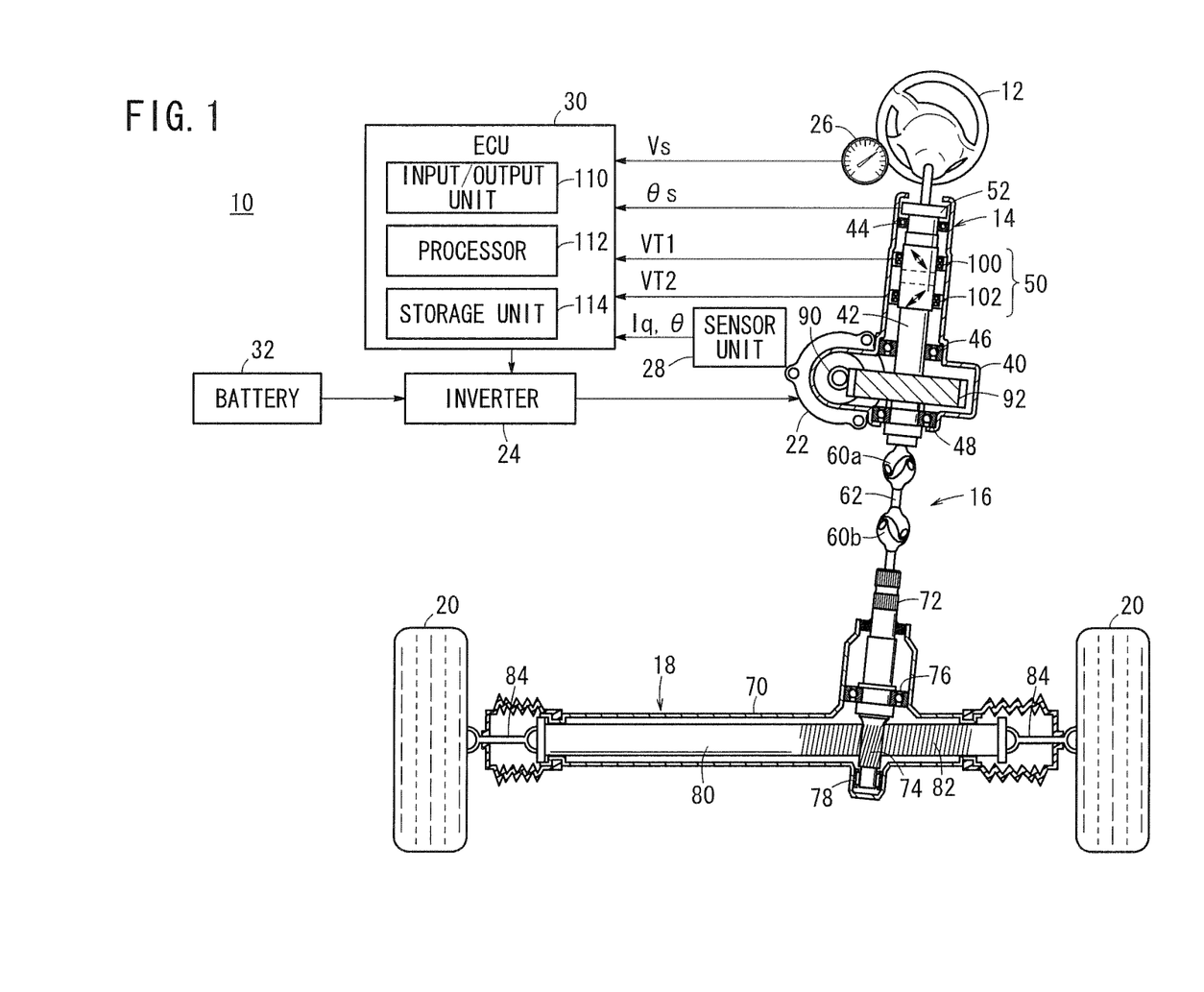
FIG. 1 is a schematic view, partly in block form, of an electric power steering apparatus according to a first embodiment of the present invention.

1. Overall System of Electric Power Steering Apparatus 10:

FIG. 1 is a schematic view, partly in block form, of an electric power steering apparatus 10 (hereinafter referred to as "power steering apparatus 10") according to a first embodiment of the present invention.

As shown in FIG. 1, the power steering apparatus 10, which is incorporated in a vehicle such as an automobile, includes a steering handle 12 (steering wheel), a steering column 14, an intermediate joint 16, a steering gearbox 18, left and right front road wheels 20 as steerable wheels, an electric motor 22, an inverter 24, a vehicle speed sensor (vehicle speed detecting unit) 26, a sensor unit 28, an electronic controller (motor control unit) 30 (hereinafter referred to as "ECU 30"), and a battery 32.

The steering column 14 has a casing 40, a steering shaft 42 rotatably supported in the casing 40 by bearings 44, 46, 48, a torque sensor (torque detecting unit) 50 mounted on the steering shaft 42, and a steering angle sensor (operational-quantity detecting unit) 52 mounted on the steering shaft 42.

The intermediate joint 16 has two universal joints 60*a*, 60*b* and a shank 62 disposed between the universal joints 60*a*, 60*b*.

The steering gearbox 18 has a casing 70, a pinion shaft 72 including a pinion 74 of a rack and pinion mechanism and supported by bearings 76, 78, a rack shaft 80 having rack teeth 82 of the rack and pinion mechanism, and a pair of tie rods 84.

2. Manual Steering System:

The steering shaft 42 has an end fixed to the steering handle 12 and another end coupled to the universal joint 60*a*. The universal joint 60*a* joins the other end of the steering shaft 42 to an end of the shank 62. The universal joint 60*b* joins the other end of the shank 62 to an end of the pinion shaft 72. The pinion 74 of the pinion shaft 72 is held in mesh with the rack teeth 82 of the rack shaft 80 which is movable back and forth in the transverse directions of the vehicle. The rack shaft 80 has opposite ends coupled to the left and right front road wheels 20, respectively, by the respective tie rods 84.

When the driver of the vehicle turns the steering handle 12, the steering handle 12 produces a steering torque Tr (rotary force), and then the steering torque Tr is transmitted to the pinion shaft 72 through the steering shaft 42 and the intermediate joint 16. The pinion 74 of the pinion shaft 72 and the rack teeth 82 of the rack shaft 80 convert the steering torque Tr into a thrust force, which displaces the rack shaft 80 in the transverse directions of the vehicle. When the rack shaft 80 is displaced, the tie rods 84 steer the front road wheels 20 to change the direction of the vehicle.

The steering shaft 42, the intermediate joint 16, the pinion shaft 72, the rack shaft 80, and the tie rods 84 jointly make up a manual steering system for transmitting a steering action applied to the steering handle 12 by the driver directly to the front road wheels 20.

3. Steering Assisting System:

(1) Assistive Drive System:

The electric motor 22 is operatively connected to the steering shaft 42 through a worm gear 90 and a worm wheel gear 92. More specifically, the electric motor 22 has an output shaft connected to the worm gear 90. The worm wheel gear 92, which is in mesh with the worm gear 90, is integrally or resiliently mounted on the steering shaft 42.

The electric motor 22, which is a three-phase AC brushless motor, for example, is supplied with electric power from the battery 32 via the inverter 24 that is controlled by the ECU 30, and generates a drive force (steering assisting force) depending on the supplied electric power. The drive force is transmitted through the output shaft of the electric motor 22, the worm gear 90, the steering shaft 42 (the worm wheel gear 92), the intermediate joint 16, and the pinion shaft 72 to the rack shaft 80, thereby assisting the driver in turning the steering handle 12. The electric motor 22, the worm gear 90, and the steering shaft 42 (the worm wheel gear 92) jointly make up an assistive drive system for generating a force (steering assistive force) which assists the driver in turning the steering handle 12.

(2) Assistive Control System:

The torque sensor 50, the vehicle speed sensor 26, the inverter 24, the sensor unit 28, and the ECU 30 jointly make up an assistive control system for controlling the assistive drive system. The assistive drive system, the assistive control system, and the battery 32 will also be referred to as a steering assisting system.

According to the present embodiment, the output power of the electric motor 22 is controlled by a so-called vector control process using a d-axis and a q-axis. The vector control process may be a vector control process disclosed in Japanese Laid-Open Patent Publication No. 2006-256542, Japanese Laid-Open Patent Publication No. 2009-090817, and Japanese Laid-Open Patent Publication No. 2010-064544, for example.

(a) Feed-Forward System Sensors:

The torque sensor 50 comprises a magnetostrictive torque sensor which is highly rigid against bending and torsional stresses, and is formed by performing a magnetostrictive plating process directly on the steering shaft 42. The torque sensor 50 includes a first detecting element 100 in the form of a magnetostrictive film and a second detecting element 102 in the form of a magnetostrictive film. The first detecting element 100 outputs a voltage (rightward toque voltage VT1) depending on a clockwise torque (rightward toque Tsr) as viewed from the driver toward the steering handle 12, to the ECU 30. The second detecting element 102 outputs a voltage (leftward toque voltage VT2) depending on a counterclockwise torque (leftward toque Ts1) as viewed from the driver toward the steering handle 12, to the ECU 30.

The vehicle speed sensor 26 detects a vehicle speed Vs [km/h] and outputs the detected vehicle speed Vs to the ECU 30. The steering angle sensor 52 detects a steering angle θs [degrees], which represents an angle through which the steering handle 12 is turned, and outputs the detected steering angle θs to the ECU 30.

The rightward toque voltage VT1, the leftward toque voltage VT2, the vehicle speed Vs, and the steering angle θs are used in a feed-forward control process by the ECU 30.

(b) Inverter 24:

The inverter 24, which is of a three-phase bridge configuration, has a DC-to-AC converting capability which converts a direct current from the battery 32 into three-phase alternating currents and supplies the three-phase alternating currents to the electric motor 22.

(c) Feedback System Sensors:

The sensor unit 28 detects a q-axis current Iq as a torque current component in the vector control process. Specifically, the sensor unit 28 includes a current sensor, not shown, for detecting currents in at least two of three phases, i.e., a U phase, a V phase, and a W phase, of the windings, not shown, of the electric motor 22, a resolver, not shown, for detecting an electric angle θ as a rotational angle of the output shaft or an outer rotor, not shown, of the electric motor 22, and a processor for calculating a q-axis current Iq based on the detected currents in the two phases and the detected electric angle θ. The function of the processor may be performed by the ECU 30.

(d) ECU 30:

As shown in FIG. 1, the ECU 30 includes an input/output unit 110, a processor 112, and a storage unit 114 as hardware units. The ECU 30 controls the output power of the electric motor 22 through the inverter 24 based on output values from the sensors described above, as will be described later.

(3) Battery 32:

The battery 32 is an electric energy storage device capable of outputting a low voltage (12 volts in the present embodiment), and may be a secondary battery such as a lead storage battery or the like.

B. Processing Sequences and Functions of ECU 30
(to Control the Output Power of the Electric Motor 22)

1. Outline:

According to the first embodiment, the ECU 30 controls a target value according to a feed-forward (FF) control process with respect to the torque generated by the electric motor 22 (hereinafter "motor target torque Ttar") by dividing the target value mainly into two components, i.e., a reference component (hereinafter referred to as "motor reference target torque Tt1" or "reference target torque Tt1") and an additive component (hereinafter referred to as "motor additive target torque Tt2" or "additive target torque Tt2").

The reference target torque Tt1 is a value for reducing a torque identified from the output signal of the torque sensor 50 (hereinafter referred to as "detected torque Ts"), close to zero. If only the reference target torque Tt1 is used, the driver feels almost no torque (resistance) even when turning the steering handle 12. The reference target torque Tt1 makes it possible to reduce the effects of the moment of inertia of the rotational shaft of the electric motor 22, the viscous resistance of grease in the bearings, and the mechanical friction of the moving parts.

The additive target torque Tt2 serves to set a torque (resistance) that the driver is to feel when turning the steering handle 12.

According to the first embodiment, while a control process (first control process) is being carried out to reduce the detected torque Ts close to zero by use of the reference target torque Tt1, a control process (second control process) is carried out to adjust the detected torque Ts by use of the additive target torque Tt2. As the reference target torque Tt1 and the additive target torque Tt2 are used as feed-forward terms, steering reaction force due to changing coefficients of friction of the road surface and different conditions of the road surface can easily be transmitted to the driver for a better steering feel. Such a better steering feel can be obtained notably particularly when the vehicle is driven at high speeds because the behavior of the vehicle is sensitive at those high speeds.

Since steering reaction force is imparted depending on changing coefficients of friction of the road surface and different conditions of the road surface, the behavior of the vehicle can easily be controlled to adapt to every driving situation of the vehicle. As a result, the number of man-hours required to develop the electric power steering apparatus 10 is reduced.

Furthermore, it is possible to improve the responsiveness of the electric power steering apparatus 10 to a steering action that is applied to the steering handle 12 by the driver.

According to the first embodiment, the reference target torque Tt1 and the additive target torque Tt2 are not directly used, but numerical values corresponding thereto are used to control, in effect, the reference target torque Tt1 and the additive target torque Tt2, as described below.

Figure 2:
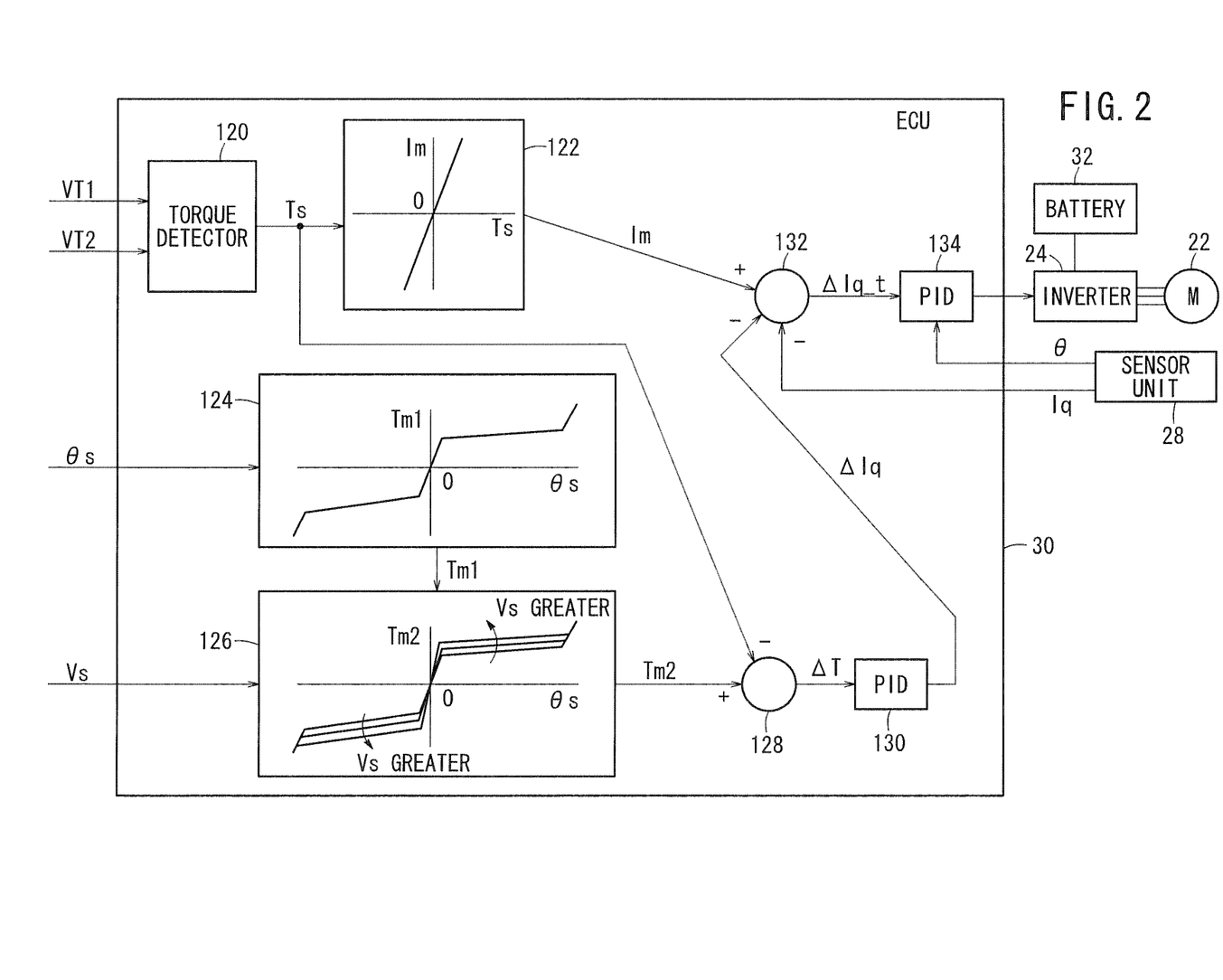
FIG. 2 is a diagram illustrative of a process of controlling the output power of a motor, which is carried out by an electronic controller of the electric power steering apparatus according to the first embodiment.

2. Details:

FIG. 2 is a diagram illustrative of a process of controlling the output power of the electric motor 22, which is carried out by the ECU 30. The ECU 30 includes, as its functional components, a torque detector 120, a target reference current calculator (first control unit) 122, a target additive torque calculator (second control unit) 124, a target additive torque corrector 126, a first subtractor 128, a first PID controller 130, a second subtractor 132, and a second PID controller 134. These functional components of the ECU 30 are implemented by executing programs stored in the storage unit 114 by the processor 112.

The torque detector 120 determines a torque, i.e., a detected torque Ts, applied to the steering shaft 42, based on the rightward toque voltage VT1 from the first detecting element 100 and the leftward toque voltage VT2 from the second detecting element 102.

Figure 3:
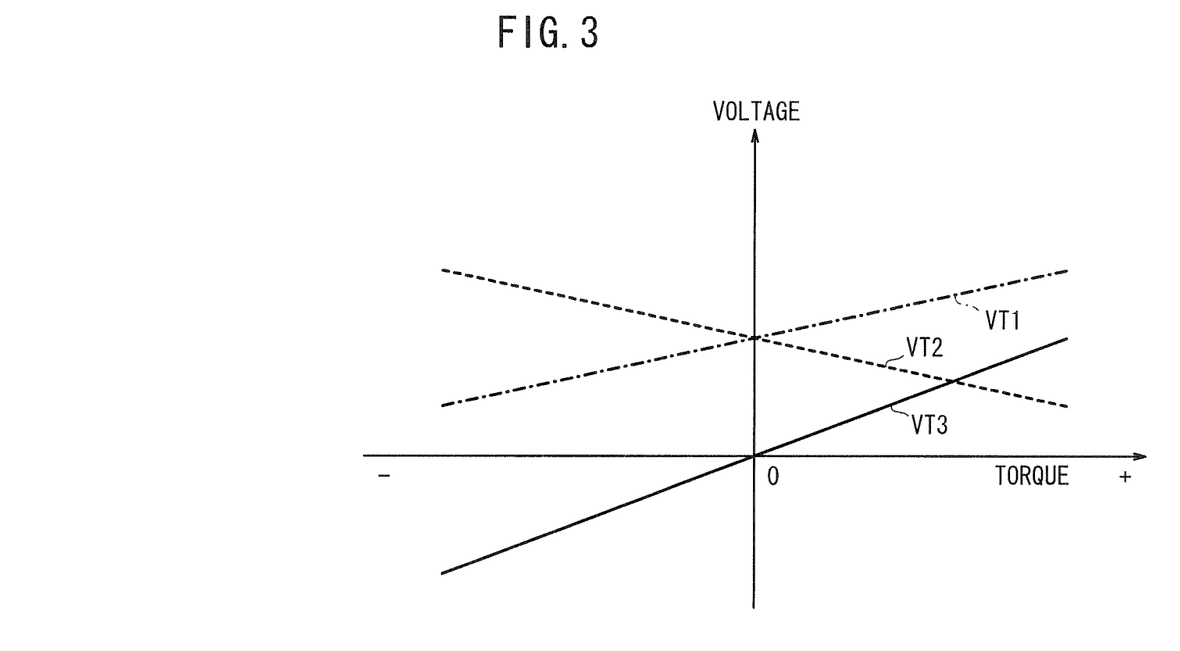
FIG. 3 is a diagram showing the relationship between torques detected by a torque sensor unit, rightward torque voltages, leftward torque voltages, and total torque voltages.

More specifically, the torque detector 120 calculates a total torque voltage VT3 which is representative of the difference between the rightward toque voltage VT1 and the leftward toque voltage VT2, and then determines the detected torque Ts based on the total torque voltage VT3 (see FIG. 3). Since a detected torque Ts can be calculated if the rightward toque voltage VT1 and the leftward toque voltage VT2 are known, a map defining the relationship between rightward and leftward toque voltages VT1, VT2 and detected torques Ts may be stored in the storage unit 114, and a detected torque Ts may be determined from the map.

The target reference current calculator 122 establishes a target reference current Im depending on the detected torque Ts. According to the present embodiment, the target reference current Im is in proportion to the detected torque Ts (see FIG. 2), and represents a q-axis current Iq for energizing the electric motor 22 in order to reduce the detected torque Ts to zero by getting rid of the effects of the moment of inertia, the viscosity of the grease, and the mechanical friction of the moving parts. If the electric motor 22 is energized by the target reference current Im only, then the detected torque Ts becomes substantially zero, and the driver feels almost no torque (resistance) when turning the steering handle 12.

The target additive torque calculator 124 establishes a first target additive torque Tm1 depending on the steering angle θs from the steering angle sensor 52. According to the present embodiment, the first target additive torque Tm1 serves to set a torque (resistance) which the driver feels when turning the steering handle 12.

More specifically, as shown in FIG. 2, change of the first target additive torque Tm1 with respect to change of the steering angle θs (i.e., the rate of increase in the first target additive torque Tm1 with respect to the steering angle θs) is set such that: when the steering angle θs is zero or nearly zero, the rate of increase in the first target additive torque Tm1 is large; when the steering angle θs grows away from zero or nearly zero, the rate of increase in the first target additive torque Tm1 is reduced; and when the steering angle θs grows further away from zero or nearly zero, the rate of increase in the first target additive torque Tm1 is increased.

The reasons for the above relationship between the first target additive torque Tm1 and the steering angle θs will be explained below. When the steering angle θs is zero or nearly zero, the vehicle is highly likely to be traveling straight, and it is thus preferable to stabilize the steering angle θs of the steering handle 12. Therefore, when the steering angle θs is zero or nearly zero, the rate of change in the torque of the electric motor 22 with respect to change in the steering angle θs, i.e., the gradient of the curve in the target additive torque calculator 124 shown in FIG. 2, is increased, whereby the steering angle θs becomes hard to change. When the steering angle θs grows away from zero or nearly zero, the vehicle is highly likely to be traveling along a curved road, and it is thus preferable to make the steering handle 12 easy to turn. Therefore, when the steering angle θs grows away from zero or nearly zero, the rate of change in the torque of the electric motor 22 with respect to change in the steering angle θs, i.e., the gradient of the curve in the target additive torque calculator 124 shown in FIG. 2, is reduced, whereby the steering angle θs becomes easy to change. When the steering angle θs grows further away from zero or nearly zero, the steering handle 12 is approaching its steering limit (turning limit), and it is thus preferable to let the driver know that it is difficult to further change the steering angle θs. Therefore, when the steering angle θs grows further away from zero or nearly zero, the rate of change in the torque of the electric motor 22 with respect to change in the steering angle θs, i.e., the gradient of the curve in the target additive torque calculator 124 shown in FIG. 2, is increased, whereby the steering angle θs becomes hard to change.

The target additive torque corrector 126 corrects the first target additive torque Tm1 calculated by the target additive torque calculator 124 depending on the vehicle speed Vs, and outputs the corrected first target additive torque Tm1 as a second target additive torque Tm2. Specifically, the target additive torque corrector 126 corrects the first target additive torque Tm1 such that the torque of the electric motor 22 is greater as the vehicle speed Vs increases from zero. Accordingly, it is possible to finely adjust the steering angle θs of the steering handle 12 when the vehicle speed Vs goes higher.

In the first embodiment, the first target additive torque Tm1 is established as a value at the time when the vehicle speed Vs is zero. However, the first target additive torque Tm1 may be established as a value at the time when the vehicle speed Vs is of a predetermined value Vs1 (>0). According to such a modification, if the vehicle speed Vs is higher than the predetermined value Vs1, the second target additive torque Tm2 is made higher than the first target additive torque Tm1, and if the vehicle speed Vs is lower than the predetermined value Vs1, the second target additive torque Tm2 is made lower than the first target additive torque Tm1.

The first subtractor 128 calculates a deviation (hereinafter referred to as "torque deviation ΔT") between the calculated second target additive torque Tm2 from the target additive torque corrector 126 and the detected torque Ts from the torque detector 120.

The first PID controller 130 calculates a target additive current deviation ΔIq for correcting a target value for the q-axis current Iq according to a PID (proportional-integral-derivative) control process in order to bring the torque deviation ΔT closely to zero.

The second subtractor 132 calculates a feed-forward target current Iff (hereinafter referred to as "FF target current Iff") which is representative of the difference between the target reference current Im from the target reference current calculator 122 and the target additive current deviation ΔIq from the first PID controller 130. The second subtractor 132 then calculates a deviation (hereinafter referred to as "target q-axis current deviation ΔIq_t") between the FF target current Iff and the q-axis current Iq from the sensor unit 28.

The second PID controller 134 controls the q-axis current Iq of the electric motor 22 through the inverter 24 according to a PID control process in order to bring the target q-axis current deviation ΔIq_t closely to zero. Details of the processing operation of the second PID controller 134 for performing the vector control process using the d-axis and the q-axis may be those disclosed in Japanese Laid-Open Patent Publication No. 2006-256542, Japanese Laid-Open Patent Publication No. 2009-090817, and Japanese Laid-Open Patent Publication No. 2010-064544, for example.

If the additive component cannot be calculated owing to a failure of the vehicle speed sensor 26 or the steering angle sensor 52, then the ECU 30 cancels the control process shown in FIG. 2, and switches to the conventional control process disclosed in U.S. Pat. No. 5,398,953 A, for example, thereby preventing the driver from feeling strange and uncomfortable in the steering under the control process (the first control process only) which uses the reference component only.

C. Advantages of the First Embodiment

According to the first embodiment, as described above, while the first control process is carried out to bring the detected torque Ts to zero, the second control process is carried out to make the detected torque Ts equal to the first target additive torque Tm1 which is greater than zero based on the steering angle θs. Since the first control process is carried out to bring the detected torque Ts to zero, it is possible to reduce the effects of the moment of inertia of the rotational shaft of the electric motor 22, the viscous resistance of the grease in the bearings, and the mechanical friction of the moving parts. At the same time, the second control process is carried out to make the detected torque Ts equal to the first target additive torque Tm1. Consequently, the detected torque Ts becomes easy to control, and for example, it is possible to prevent sluggish steering response caused by a feedback response delay due to the effects of the moment of inertia, etc. Further, it is easy to transmit steering reaction force depending on changing coefficients of friction of the road surface and different conditions of the road surface to the driver for a better steering feel.

The above advantages also can be understood from the fact described below. An assistive torque AH generated by the electric motor 22 is expressed by the following expression (2):

$$AH = kA \times Ts - Ine \cdot (d^2\theta s/dt^2) - cm \cdot (d\theta s/dt) \pm fm \quad (2)$$

where kA represents a coefficient of the assistive torque AH, Ts the detected torque, Ine the moment of inertia of the rotational shaft of the electric motor 22, θs the steering angle of the steering handle 12, dθs/dt a first-order differential value (angular velocity) of θs, $d^2\theta s/dt^2$ a second-order differential value (angular acceleration) of θs, cm the viscosity (viscous coefficient) of the grease in the bearings, and fm the mechanical friction.

If a load torque that is indicative of a load between the tires and the road is represented by TT, then the following expressions (3) through (5) are satisfied:

$$TT = Ts + AH \quad (3)$$

$$= Ts + kA \times Ts - Ine \cdot (d^2\theta s/dt^2) - cm \cdot (d\theta s/dt) \mp fm \quad (4)$$

$$Ts = TT/(1+kA) + \{Ine \cdot (d^2\theta s/dt^2) + cm \cdot (d\theta s/dt) \pm fm\}/(1+kA) \quad (5)$$

From the above expressions, the steering torque Ts is reduced to 1/(1+kA) of the load torque TT (kA>0).

According to the technology disclosed in U.S. Pat. No. 5,398,953 A, because of the moment of inertia Ine, the viscous coefficient cm and the mechanical friction fm, the detected torque is greatly affected under the influence of the second term of the expression (5), particularly when the vehicle is running at high speed. As a result, the steering feel that the driver has is impaired.

According to the first embodiment, the value of kA in the expression (2) can be increased. If kA=∞, then Ts=0. At this time, it is possible to eliminate the effects of the moment of inertia Ine, the viscous coefficient cm, and the mechanical friction fm. Even if kA is not equal to ∞, any value of kA>10 is equivalent to kA=∞. Depending on the vehicle which incorporates the electric power steering apparatus 10, any value of kA>5 may be employed. Since the value of kA is not reduced depending on the vehicle speed Vs, the detected torque is not affected by the moment of inertia Ine, the viscous coefficient cm, and the mechanical friction fm even when the vehicle is traveling at a high speed.

The additive target torque Tt2 serves to set a torque (resistance) that the driver feels when turning the steering handle 12. While the first control process is carried out to bring the detected torque Ts to zero with the reference target torque Tt1, the second control process can be carried out to adjust the detected torque Ts with the additive target torque Tt2. Inasmuch as the reference target torque Tt1 and the additive target torque Tt2 are used as feed-forward terms, steering reaction force due to varying coefficients of friction provided by different road surfaces including dry, wet, sandy, snowy, and frozen road surfaces, and split road surfaces and also due to different conditions of road surfaces including ruts and road shoulders can easily be transmitted to the driver for a better steering feel. Such a tendency to make it easy to transmit steering reaction force to the driver, can be obtained particularly when the vehicle drives at high speeds because the behavior of the vehicle is sensitive at those high speeds.

According to the first embodiment, steering reaction force is applied depending on changing coefficients of friction of the road surface and different conditions of the road surface. Now, it is assumed that a certain steering quantity θs1 is generated in each of two road conditions, i.e., a road condition wherein the coefficient of friction of the road surface is low (hereinafter referred to as "low-μ road condition") and a road condition wherein the coefficient of friction of the road surface is high (hereinafter referred to as "high-μ road condition"). If the driver generates the same steering quantity θs1 with the same force, the detected torque Ts is lower in the low-μ road condition. Therefore, in the low-μ road condition, the target reference current Im (see FIG. 2) is smaller and the torque deviation ΔT and the target additive current deviation ΔIq are greater. As a result, the ratio of the target additive current deviation ΔIq to the target reference current Im is greater in the low-μ road condition. Therefore, it is possible to apply steering reaction force depending on the coefficient of friction of the road surface. Since steering reaction force can be applied depending on changing coefficients of friction of the road surface and different conditions of the road surface, the behavior of the vehicle can easily be adapted for every driving situation of the vehicle. As a result, the number of man-hours required to develop the electric power steering apparatus 10 is reduced.

According to the first embodiment, the ECU 30 uses the second target additive torque Tm2 which is produced by correcting the first target additive torque Tm1 based on the vehicle speed Vs. Consequently, the first target additive torque Tm1 can be adjusted depending on the vehicle speed Vs. According to the first embodiment, the first target additive torque Tm1 as an additive component is used as a target value for the detected torque Ts. Since the target value for the detected torque Ts can be adjusted depending on the vehicle speed Vs, it is possible to control the steering torque for a better steering feel.

According to the first embodiment, if the additive component cannot be calculated owing to a failure of the vehicle speed sensor 26 or the steering angle sensor 52, then the ECU 30 cancels the above control process (shown in FIG. 2), and switches to the conventional control process disclosed in U.S. Pat. No. 5,398,953 A, for example, thereby preventing the driver from feeling strange and uncomfortable in the steering under the control process (the first control process only) which uses the reference component only.

II. Second Embodiment

A. Overall Arrangement of Electric Power Steering Apparatus 10A (Differences With the First Embodiment)

Figure 4:
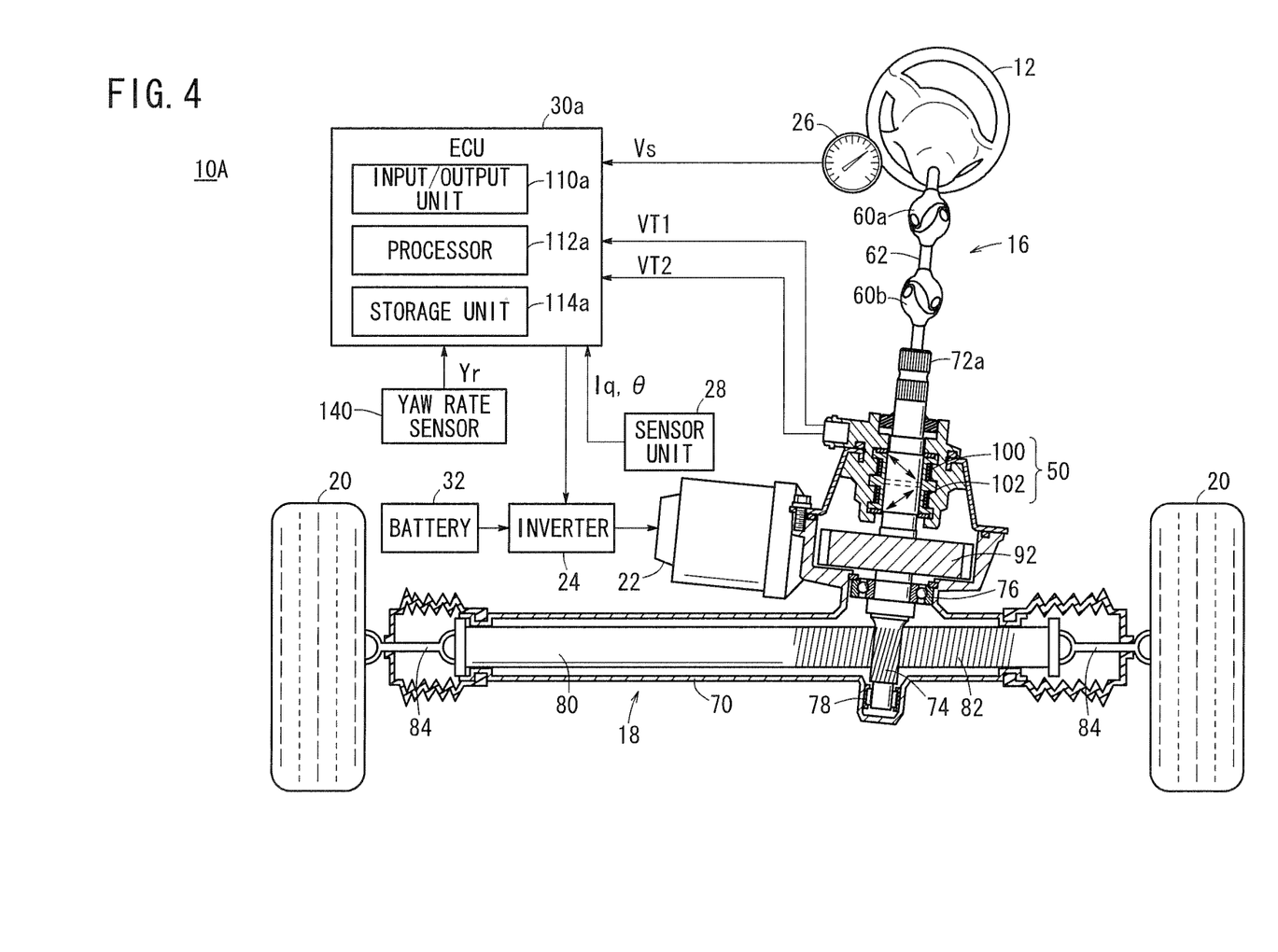
FIG. 4 is a schematic view, partly in block form, of an electric power steering apparatus according to a second embodiment of the present invention.

FIG. 4 is a schematic view, partly in block form, of an electric power steering apparatus 10A (hereinafter referred to as "power steering apparatus 10A") according to a second embodiment of the present invention. The power steering apparatus 10A according to the second embodiment is basically of the same arrangement as the power steering apparatus 10 according to the first embodiment. Those components of the power steering apparatus 10A which are identical to those of the power steering apparatus 10 are denoted by identical reference characters, and will not be described in detail below.

According to the first embodiment, the intermediate joint 16 is disposed between the steering column 14 and the steering gearbox 18. According to the second embodiment, the intermediate joint 16 is disposed between the steering handle 12 and a pinion shaft 72a (steering shaft). According to the second embodiment, furthermore, a yaw rate sensor (vehicle-behavior detecting unit) 140 is added instead of the steering angle sensor 52.

An electronic controller (motor control unit) 30a (hereinafter referred to as "ECU 30a") according to the second embodiment includes an input/output unit 110a, a processor 112a and a storage unit 114a as hardware units. The ECU 30a controls the output power of the electric motor 22 through the inverter 24 based on output values from the sensors, as will be described in detail later.

B. Processing Sequences and Functions of ECU 30a (to Control the Output Power of the Electric Motor 22)

1. Outline:

As with the ECU 30 according to the first embodiment, the ECU 30a according to the second embodiment controls a motor target torque Ttar for a torque generated by the electric motor 22 mainly by dividing the motor target torque Ttar into two components, i.e., a reference component (reference target torque Tt1) and an additive component (additive target torque Tt2).

According to the second embodiment, therefore, while the first control process is carried out to bring the detected torque Ts to zero with the reference target torque Tt1, the second control process can be carried out to adjust the detected torque Ts with the additive target torque Tt2. Since the reference target torque Tt1 and the additive target torque Tt2 are used as feed-forward terms, a steering feel and steering responsiveness of the power steering apparatus 10A at the time the driver turns the steering handle 12 are further improved.

Figure 5:
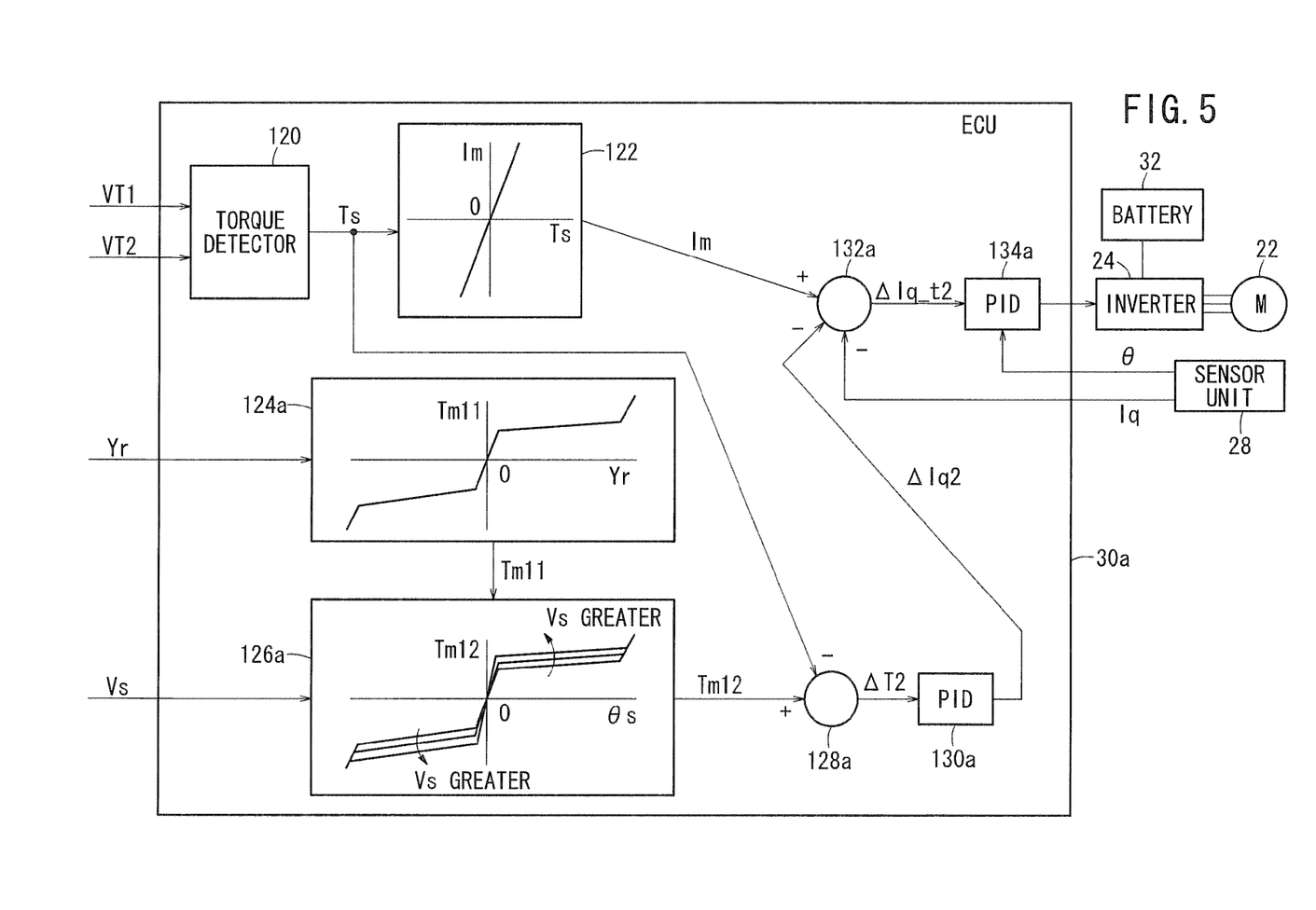
FIG. 5 is a diagram illustrative of a process of controlling the output power of a motor, which is carried out by an electronic controller of the electric power steering apparatus according to the second embodiment.

2. Details:

FIG. 5 is a diagram illustrative of a process of controlling the output power of the electric motor 22, which is carried out by the ECU 30a. The ECU 30a includes, as its functional components, a torque detector 120, a target reference current calculator 122, a target additive torque calculator 124a, a target additive torque corrector 126a, a first subtractor 128a, a first PID controller 130a, a second subtractor 132a, and a second PID controller 134a.

The torque detector 120 and the target reference current calculator 122 are identical respectively to the torque detector 120 and the target reference current calculator 122 according to the first embodiment.

The target additive torque calculator 124a establishes a first target additive torque Tm11 depending on a yaw rate Yr from the yaw rate sensor 140. According to the second embodiment, the first target additive torque Tm11 serves to set a torque (resistance) which the driver feels when turning the steering handle 12.

As shown in FIG. 5, change of the first target additive torque Tm11 with respect to change of the yaw rate Yr (i.e., the rate of increase in the first target additive torque Tm11 with respect to the yaw rate Yr) is set such that: when the yaw rate Yr is zero or nearly zero, the rate of increase in the first target additive torque Tm11 with respect to the yaw rate Yr is large; when the yaw rate Yr grows away from zero or nearly zero, the rate of increase in the first target additive torque Tm11 is reduced; and when the yaw rate Yr grows further away from zero or nearly zero, the rate of increase in the first target additive torque Tm11 is increased.

The reasons for the above relationship between the first target additive torque Tm11 and the yaw rate Yr will be explained below. When the yaw rate Yr is zero or nearly zero, the vehicle is highly likely to be traveling straight, and it is thus preferable to stabilize the steering angle θs of the steering handle 12. Therefore, when the yaw rate Yr is zero or nearly zero, the rate of change in the torque of the electric motor 22 with respect to change in the yaw rate Yr, i.e., the gradient of the curve in the target additive torque calculator 124a shown in FIG. 5, is increased, whereby the steering angle θs becomes hard to change. When the yaw rate Yr grows away from zero or nearly zero, the vehicle is highly likely to be traveling along a curved road, and it is thus preferable to make the steering handle 12 easier to turn. Therefore, when the yaw rate Yr grows away from zero or nearly zero, the rate of change in the torque of the electric motor 22 with respect to change in the yaw rate Yr, i.e., the gradient of the curve in the target additive torque calculator 124a shown in FIG. 5, is reduced, whereby the steering angle θs becomes easy to change. When the yaw rate Yr grows further away from zero or nearly zero, the steering handle 12 is approaching its steering limit (turning limit), and it is thus preferable to let the driver know that it is difficult to further change the steering angle θs. Therefore, when the yaw rate Yr grows further away from zero or nearly zero, the rate of change in the torque of the electric motor 22 with respect to change in the yaw rate Yr, i.e., the gradient of the curve in the target additive torque calculator 124a shown in FIG. 5, is increased, whereby the steering angle θs becomes hard to change.

The target additive torque corrector 126a corrects the first target additive torque Tm11 calculated by the target additive torque calculator 124a depending on the vehicle speed Vs, and outputs the corrected first target additive torque Tm11 as a second target additive torque Tm12. Specifically, the target additive torque corrector 126a corrects the first target additive torque Tm11 such that the torque of the electric motor 22 is greater as the vehicle speed Vs increases from zero. Accordingly, it is possible to finely adjust the steering angle θs of the steering handle 12 when the vehicle speed Vs goes higher.

In the second embodiment, the first target additive torque Tm11 is established as a value at the time when the vehicle speed Vs is zero. However, the first target additive torque Tm11 may be established as a value at the time when the vehicle speed Vs is of a predetermined value Vs2 (>0). According to such a modification, if the vehicle speed Vs is higher than the predetermined value Vs2, the second target additive torque Tm12 is made higher than the first target additive torque Tm11, and if the vehicle speed Vs is lower than the predetermined value Vs2, the second target additive torque Tm12 is made lower than the first target additive torque Tm11.

The first subtractor 128a calculates a deviation (hereinafter referred to as "torque deviation ΔT2") between the calculated second target additive torque Tm12 from the target additive torque corrector 126a and the detected torque Ts from the torque detector 120.

The first PID controller 130a calculates a target additive current deviation ΔIq2 for correcting a target value for the q-axis current Iq according to a PID (proportional-integral-derivative) control process in order to bring the torque deviation ΔT2 closely to zero.

The second subtractor 132a calculates a feed-forward target current Iff2 (hereinafter referred to as "FF target current Iff2") which is representative of the difference between the target reference current Im from the target reference current calculator 122 and the target additive current deviation ΔIq2 from the first PID controller 130a. The second subtractor 132a then calculates a deviation (hereinafter referred to as "target q-axis current deviation ΔIq_t2") between the FF target current Iff2 and the q-axis current Iq from the sensor unit 28.

The second PID controller 134a controls the q-axis current Iq of the electric motor 22 through the inverter 24 according to a PID control process in order to bring the target q-axis current deviation ΔIq_t2 closely to zero. Details of the processing operation of the second PID controller 134a for performing the vector control process using the d-axis and the q-axis may be those disclosed in Japanese Laid-Open Patent Publication No. 2006-256542, Japanese Laid-Open Patent Publication No. 2009-090817, and Japanese Laid-Open Patent Publication No. 2010-064544, for example.

If the additive component cannot be calculated owing to a failure of the vehicle speed sensor 26 or the yaw rate sensor 140, then the ECU 30a cancels the control process shown in FIG. 5, and switches to the conventional control process disclosed in U.S. Pat. No. 5,398,953 A, for example, thereby preventing the driver from feeling strange and uncomfortable in the steering under the control process (the first control process only) which uses the reference component only.

C. Advantages of the Second Embodiment

The power steering apparatus 10A according to the second embodiment offers the same advantages as the power steering apparatus 10 according to the first embodiment.

According to the second embodiment, in addition since the yaw rate sensor 140 is used instead of the steering angle sensor 52, the power steering apparatus 10A is applicable to a case where no steering angle sensor 52 is used or the steering angle sensor 52 is suffering a failure.

III. Modifications

The present invention is not limited to the above embodiments, but may adopt various arrangements based on the contents of the present description. For example, the present invention may adopt the following arrangements:

A. Electric Motor 22

In each of the above embodiments, the electric motor 22 is a three-phase AC brushless motor. However, the electric motor 22 may be a three-phase brush motor or a DC motor.

B. Steering Angle Sensor 52 and Yaw Rate Sensor 140

In the first embodiment, the steering angle θs is used as an operational quantity of an operating member for generating a behavior of the vehicle in the transverse directions thereof or horizontal rotational directions, and the steering angle sensor 52 is used as a means for detecting the steering angle θs. However, an operational quantity of an operating member for generating a behavior of the vehicle in the transverse directions thereof or horizontal rotational directions is not limited to the steering angle θs, but may be another quantity. For example, a displacement of the rack shaft 80 in the transverse directions of the vehicle may be used as such an operational quantity, and a displacement sensor (optical type, magnetic type, etc.), for example, may be used as a means for detecting such a displacement.

In the second embodiment, the yaw rate Yr is used as a quantity representative of a behavior of the vehicle in the transverse directions thereof or horizontal rotational directions, and the yaw rate sensor 140 is used as a means for detecting the yaw rate Yr. However, the yaw rate Yr may be detected by another means. For example, the yaw rate Yr may be calculated based on continuous values of positional information calculated by a navigation apparatus, not shown. A quantity representative of a behavior of the vehicle in the transverse directions thereof or horizontal rotational directions is not limited to the yaw rate Yr, but may be another quantity. For example, an acceleration (lateral acceleration) of the vehicle in the transverse directions thereof may be used as such a quantity representative of a behavior of the vehicle, and a lateral acceleration sensor may be used as a means for detecting such a lateral acceleration.

The steering angle θs from the steering angle sensor 52 and the yaw rate Yr from the yaw rate sensor 140 may be used in combination. Alternatively, the steering angle θs from the steering angle sensor 52, the yaw rate Yr from the yaw rate sensor 140, and the lateral acceleration from the lateral acceleration sensor may be used in combination.

C. Reference and Additive Components of FF Control Process

1. Establishment of Reference Component (First Control Process):

In each of the above embodiments, the reference component (motor reference target torque Tt1 or target reference current Im) represents the q-axis current Iq for energizing the electric motor 22 such that the effects of the moment of inertia, the viscosity of the grease and the mechanical friction of the moving parts are eliminated and the detected torque Ts is reduced to zero.

However, the reference component may not be used to reduce the detected torque Ts to zero. The reference component may be a q-axis current Iq for energizing the electric motor 22 such that the detected torque Ts is of a value equal to or lower than mechanical friction (a first example of a first predetermined value referred to in appended claims). The mechanical friction represents the sum of friction of the electric motor 22, friction of the rack and pinion mechanism, friction of the tie rods 84, friction of the worm gear 90, etc. Alternatively, the reference component may be a q-axis current Iq for energizing the electric motor 22 such that the inertia of the electric motor 22 is of a value (a second example of the first predetermined value referred to in appended claims) which is negligible, i.e., a value small enough to dispense with inertia control. According to these modifications, the target additive torque calculator 124, 124a (second control process) sets the target additive torque to a value (second predetermined value) which is greater than the above predetermined value (first predetermined value).

Figure 6:
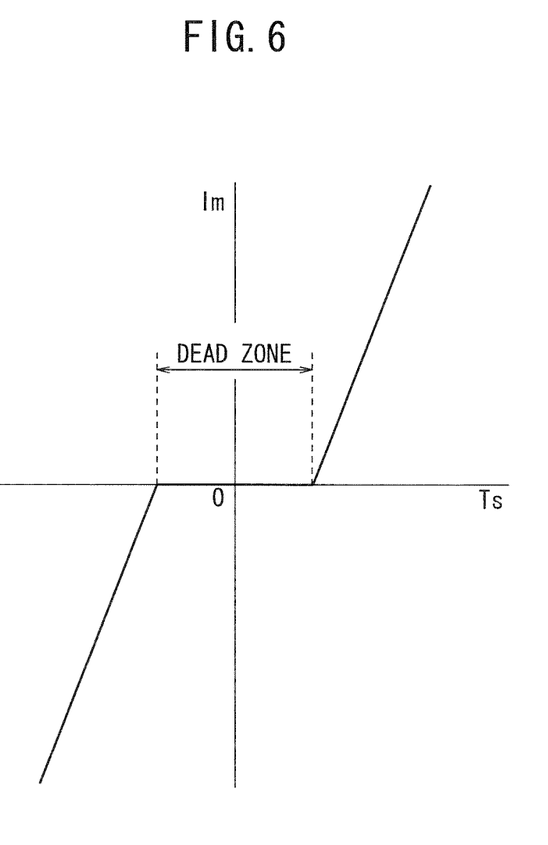
FIG. 6 is a diagram showing a modification of the relationship between detected torques and motor target reference currents.

As shown in FIG. 6, a dead zone may be provided in a region where the detected torque Ts is nearly zero. The dead zone prevents the detected torque Ts from becoming zero when the detected torque Ts is nearly zero, thereby making the driver feel a torque (resistance) when turning the steering handle 12. Therefore, a torque is applied in order to keep the steering angle θs of the steering handle 12 constant, so that the driver can have a stable steering feel with the steering handle 12 being positioned stably when the steering angle θs is nearly zero. In addition, drift, temperature characteristics and noise of the first detecting element 100 and the second detecting element 102 of the torque sensor 50 are prevented from affecting the control, thereby making it possible to perform a stable control process.

2. Establishment of Additive Component (Second Control Process):

(1) Target Additive Torque Corrector 126, 126a:

In each of the above embodiments, the target additive torque calculator 124, 124a and the target additive torque corrector 126, 126a are used in combination to establish the additive component (second target additive torque Tm2, Tm12). However, without use of the target additive torque corrector 126, 126a, only the target additive torque calculator 124, 124a may be used to establish the additive component (first target additive torque Tm1, Tm11).

(2) Mapping:

In the first embodiment, the first target additive torque Tm1 is established based on the steering angle θs, and the second target additive torque Tm2 is established by correcting the first target additive torque Tm1 depending on the vehicle speed Vs. However, establishing of the additive component is not limited to the above, and an additive component may be established based on a plurality of maps for respective vehicle speeds Vs, each map representing the relationship between steering angles θs and additive components (target additive torques Tm). In this case, one of the maps is selected based on the vehicle speed Vs that is detected, and an additive component (target additive torque Tm) corresponding to the steering angle θs that is detected is selected from the selected map and output to the first subtractor 128.

In the second embodiment, the first target additive torque Tm11 is established based on the yaw rate Yr, and the second target additive torque Tm12 is established by correcting the first target additive torque Tm11 depending on the vehicle speed Vs. However, establishing of the additive component is not limited to the above, and an additive component may be established based on a plurality of maps for respective vehicle speeds Vs, each map representing the relationship between yaw rates Yr and additive components (target additive torques Tm). In this case, one of the maps is selected based on the vehicle speed Vs that is detected, and an additive component (target additive torque Tm) corresponding to the yaw rate Yr that is detected is selected from the selected map and output to the first subtractor 128a.

Alternatively, in the first embodiment, a map may be produced which represents the relationship between steering angles θs, vehicle speeds Vs and additive components (target additive torques Tm), and an additive component (target additive torque Tm) may be established by use of the map based on the steering angle θs and the vehicle speed Vs that are detected. Similarly, in the second embodiment, a map may be produced which represents the relationship between yaw rates Yr, vehicle speeds Vs and additive components (target additive torques Tm), and an additive component (target additive torque Tm) may be established by use of the map based on the yaw rate Yr and the vehicle speed Vs that are detected.

(3) Others:

If the steering angle θs from the steering angle sensor 52 and the yaw rate Yr from the yaw rate sensor 140 are used in combination, as described above, then the sum of the first target additive torque Tm1 and the first target additive torque Tm11 may be used. Similarly, if the steering angle θs from the steering angle sensor 52, the yaw rate Yr from the yaw rate sensor 140, and the lateral acceleration from the lateral acceleration sensor are used in combination, then the sum of the first target additive torque Tm1, the first target additive torque Tm11 and a first target additive torque Tm21 based on the lateral acceleration may be used. According to this modification, since all the output signals from the steering angle sensor 52, the yaw rate sensor 140, and the lateral acceleration sensor are used to generate a steering assisting force, the steering assisting force can be applied appropriately and precisely in a wide vehicle speed range from a low vehicle speed to a high vehicle speed, thereby to further improve the steering feel.

The target additive torque calculator 124 according to the first embodiment employs the map representative of the relationship between steering angles θs and first target additive torques Tm1. However, the target additive torque calculator 124 may employ another map. For example, the target additive torque calculator 124 may employ a map representative of the relationship between steering angles θs and target values for the q-axis current Iq of the additive component. According to such a modification, the first PID controller 130 is dispensed with, thereby making it possible to simplify the power steering apparatus 10 in structure.

D. Others

Figure 7:
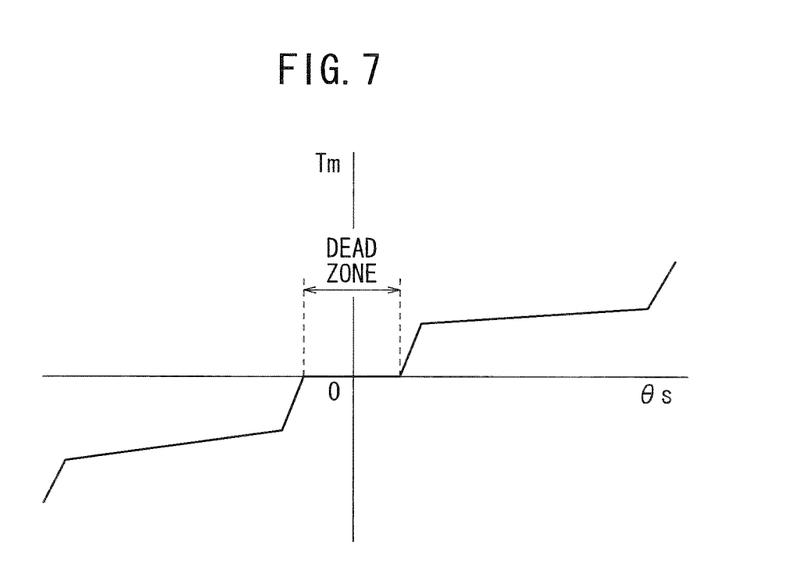
FIG. 7 is a diagram showing a modification of the relationship between detected torques and motor target additive torques.

As shown in FIG. 7, the map employed by the target additive torque calculator 124 may include a dead zone in a region where the steering angle θs is near zero. The dead zone prevents an unintended calculation of a target additive torque Tm in the case where the steering angle sensor 52 accidentally detects a small angle within the dead zone due to a detection error although the steering handle 12 is in a neutral position because the steering angle sensor 52 has a low level of detection accuracy. With the dead zone included in the map employed by the target additive torque calculator 124, steering reaction force is almost zero in the dead zone, and as a result, straight-running stability of the vehicle may possibly be impaired when the steering handle 12 is nearly in the neutral position. However, if the reference target torque Tt1 is set to the first predetermined value described above, then there is produced as much friction as the first predetermined value, and thus the vehicle is capable of traveling straight stably when the steering handle 12 is nearly in the neutral position. If the dead zone is provided in a region where the detected torque Ts is nearly zero, as shown in FIG. 6, then more friction is produced, and thus the vehicle is capable of traveling straight more stably when the steering handle 12 is nearly in the neutral position. With the dead zone provided as shown in FIG. 6, it is possible to prevent an unnecessary calculation of an additive component (second target additive torque Tm2) caused by the detection accuracy of the steering angle sensor 52, and also to enable the vehicle to travel straight stably when the steering handle 12 is nearly in the neutral position. Accordingly, the driver is given a high steering feel, i.e., the steering handle 12 is stably positioned when the steering angle θs is nearly zero. This holds true if the yaw rate Yr is used instead of the steering angle θs.

The ECU 30 according to the first embodiment controls the electric motor 22 according to the control process shown in FIG. 2. However, according to a modification, the control process shown in FIG. 2 may be combined with a conventional control process. For example, the conventional control process disclosed in U.S. Pat. No. 5,398,953 A, for example, may be performed in a low vehicle speed range, and the control process according to the first embodiment may be performed in a high vehicle speed range. Switching between the conventional control process and the control process according to the first embodiment may be carried out as follows: A threshold value for the vehicle speed Vs is established in advance, and when the vehicle speed Vs is equal to or lower than the threshold value, the conventional control process may be performed, and when the vehicle speed Vs is higher than the threshold value, the control process according to the first embodiment may be performed. This modification allows the driver to have a stable steering feel in the high vehicle speed range in which an inertial component is greater. The modification is also applicable to the second embodiment. According to a further modification, the process of controlling the additive component according to the first embodiment and the process of controlling the additive component according to the second embodiment may be combined with each other.

Although certain preferred embodiments of the present invention have been shown and described in detail, it should be understood that various changes and modifications may be made therein without departing from the scope of the appended claims.

What is claimed is:

1. An electric power steering apparatus in a vehicle having road wheels and a steering handle which is operatively connected to the road wheels through a steering shaft, comprising:
    a torque detecting unit for detecting a steering torque from the steering handle;
    an electric motor operatively connected to the steering shaft;
    a motor control unit for controlling the electric motor;
    at least one of an operational-quantity detecting unit and a vehicle-behavior detecting unit, the operational-quantity detecting unit detecting an operational quantity of an operating member for generating a behavior of the vehicle in transverse directions thereof or horizontal rotational directions, the vehicle-behavior detecting unit for detecting a quantity representative of the behavior of the vehicle in the transverse directions or the horizontal rotational directions;
    wherein the motor control unit includes:
        a first control unit for establishing a target reference current of the electric motor depending on the steering torque detected by the torque detecting unit; and
        a second control unit for calculating a target additive torque based on the operational quantity detected by the operational-quantity detecting unit or the quantity detected by the vehicle-behavior detecting unit, and calculating a target additive current deviation of the electric motor so as to bring a torque deviation between the target additive torque and the steering torque detected by the torque detecting unit closely to zero;
    wherein the motor control unit controls the electric motor based on a deviation between the target reference current and the target additive current deviation; and
    wherein there is a continuous mechanical connection between the road wheels and the steering handle.

2. The electric power steering apparatus according to claim 1, further comprising:
    a vehicle speed detecting unit for detecting a vehicle speed of the vehicle;
    wherein the motor control unit corrects the output signal from the second control unit based on the vehicle speed detected by the vehicle speed detecting unit.

3. The electric power steering apparatus according to claim 1, wherein the operational-quantity detecting unit detects a steering quantity of the steering handle.

4. The electric power steering apparatus according to claim 1, wherein the vehicle-behavior detecting unit comprises at least one of a lateral acceleration sensor for detecting a lateral acceleration of the vehicle and a yaw rate sensor for detecting a yaw rate of the vehicle.

5. The electric power steering apparatus according to claim 1, wherein the motor control unit controls the first control unit and the second control unit such that the first control unit controls the steering torque detected by the torque detecting unit in the event of a failure of the second control unit.

6. The electric power steering apparatus according to claim 1, wherein the steering torque is a value equal to mechanical friction, which comprises the sum of friction of the electric motor, friction of a rack and pinion mechanism, friction of tie rods, friction of a worm gear.

7. A method performed by an electric power steering apparatus in a vehicle having road wheels and a steering handle which is operatively connected to the road wheels through a steering shaft, the method comprising:
    detecting a steering torque from the steering handle, wherein the steering torque is due to moment of inertia of an electric motor, the viscosity of grease applied to the steering shaft, and the mechanical friction of the steering shaft;
    detecting at least one of an operational-quantity and a vehicle-behavior quantity, the operational-quantity being an operational quantity of an operating member for generating a behavior of the vehicle in transverse directions thereof or horizontal rotational directions, the vehicle-behavior quantity being a quantity representative of the behavior of the vehicle in the transverse directions or the horizontal rotational directions;
    establishing a target reference current of the electric motor depending on the detected steering torque;
    calculating a target additive torque based on the operational quantity detected by the operational-quantity detecting unit or the quantity detected by the vehicle-behavior detecting unit, and calculating a target additive current deviation of the electric motor so as to bring a torque deviation between the target additive torque and the steering torque detected by the torque detecting unit closely to zero; and controlling the electric motor operatively connected to the steering shaft based on a deviation between the target reference current and the target additive current deviation.

* * * * *